(12) United States Patent
Kim

(10) Patent No.: US 8,395,481 B2
(45) Date of Patent: Mar. 12, 2013

(54) APPARATUS FOR RECOGNIZING RADIO FREQUENCY IDENTIFICATION (RFID) AND METHOD THEREOF, AND DATA PROCESSING METHOD OF RFID

(75) Inventor: Yeon-Soo Kim, Seoul (KR)

(73) Assignee: KT Corporation, Gyeonggi-do (KR)

( * ) Notice: Subject to any disclaimer, the term of this patent is extended or adjusted under 35 U.S.C. 154(b) by 1170 days.

(21) Appl. No.: 12/294,041

(22) PCT Filed: Jun. 30, 2006

(86) PCT No.: PCT/KR2006/002576
§ 371 (c)(1),
(2), (4) Date: Oct. 21, 2008

(87) PCT Pub. No.: WO2007/108576
PCT Pub. Date: Sep. 27, 2007

(65) Prior Publication Data
US 2009/0115582 A1 May 7, 2009

(30) Foreign Application Priority Data

Mar. 23, 2006 (KR) .......................... 10-2006-0026405

(51) Int. Cl.
*H04Q 5/22* (2006.01)
*G05B 23/02* (2006.01)
*G09B 21/00* (2006.01)
*H04J 3/02* (2006.01)
*G06F 13/38* (2006.01)

(52) U.S. Cl. .................... 340/10.2; 340/10.1; 340/3.41; 340/4.6; 340/3.51; 370/462; 710/46

(58) Field of Classification Search .................. 340/3.41
See application file for complete search history.

(56) References Cited

U.S. PATENT DOCUMENTS

| | | | |
|---|---|---|---|
| 5,591,951 A | 1/1997 | Doty | |
| 6,377,203 B1 | 4/2002 | Doany | |
| 6,480,143 B1 | 11/2002 | Kruger et al. | |
| 6,646,543 B1 | 11/2003 | Mardinian et al. | |
| 6,690,263 B1 | 2/2004 | Grieu | |
| 6,749,117 B2 * | 6/2004 | Nakabe et al. | 235/435 |
| 6,919,802 B2 | 7/2005 | Hartmann et al. | |
| 7,011,250 B2 * | 3/2006 | Nakabe et al. | 235/487 |
| 2004/0012486 A1 * | 1/2004 | Mani | 340/10.2 |
| 2004/0054394 A1 | 3/2004 | Lee | |
| 2004/0063435 A1 | 4/2004 | Sakamoto et al. | |

(Continued)

FOREIGN PATENT DOCUMENTS

| | | |
|---|---|---|
| JP | H11-203430 | 7/1999 |
| JP | 2000-113127 A | 4/2000 |
| JP | 2000-187711 | 7/2000 |

(Continued)

*Primary Examiner* — Jennifer Mehmood
*Assistant Examiner* — Pameshanand Mahase
(74) *Attorney, Agent, or Firm* — IP Legal Services, LLC

(57) ABSTRACT

The present invention relates to an RFID reader and a method thereof, and an RFID data processing method. The RFID reader generates a specific query message to a plurality of RFIDs, receives a first response message corresponding to the query message from at least one RFID among the RFIDs, and sequentially identifies a tag ID of a collided RFID by using a collision solving message when a collision occurs according to the result of receiving a first response message. The RFID reader can quickly and accurately identify a plurality of RFIDs since it can eliminate an unnecessary time such as excessive no response slot generation or repeated rounds through a sequential identification process for the collided RFIDs.

30 Claims, 8 Drawing Sheets

U.S. PATENT DOCUMENTS

| | | | |
|---|---|---|---|
| 2004/0085208 A1* | 5/2004 | Fukuoka | 340/572.1 |
| 2005/0280505 A1* | 12/2005 | Humes et al. | 340/10.1 |
| 2007/0096877 A1* | 5/2007 | Quan et al. | 340/10.2 |

FOREIGN PATENT DOCUMENTS

| | | |
|---|---|---|
| JP | 2002-203219 | 7/2002 |
| JP | 2004-054394 A | 2/2004 |
| JP | 2005-084926 | 3/2005 |
| JP | 2005-136972 | 5/2005 |
| JP | 2006-073034 | 3/2006 |
| KR | 1020020017846 | 3/2002 |
| KR | 1020040007901 | 1/2004 |
| KR | 1020050027100 | 3/2005 |
| KR | 10-2005-0047670 A | 5/2005 |
| KR | 1020060005487 | 1/2006 |
| KR | 10-0627656 B1 | 9/2006 |

* cited by examiner

FIG. 7

| Tag number \ Temporary identifier | LSB (Least Significant bit) | | | | | | | | | | | | | | | MSB (Most Significant bit) |
|---|---|---|---|---|---|---|---|---|---|---|---|---|---|---|---|---|
| 1 | 0 | 0 | 0 | 0 | 1 | 0 | 0 | 0 | 1 | 1 | 1 | 0 | 1 | 1 | 1 | 0 |
| 2 | 0 | 0 | 1 | 0 | 0 | 1 | 0 | 1 | 0 | 1 | 1 | 1 | 0 | 1 | 1 | 1 |
| 3 | 0 | 1 | 0 | 1 | 1 | 1 | 0 | 1 | 0 | 0 | 0 | 1 | 0 | 0 | 0 | 1 |
| 4 | 0 | 1 | 1 | 0 | 0 | 1 | 0 | 0 | 1 | 0 | 1 | 1 | 1 | 0 | 1 | 1 |
| 5 | 0 | 1 | 1 | 1 | 0 | 0 | 1 | 0 | 1 | 0 | 0 | 1 | 0 | 1 | 0 | 0 |
| 6 | 0 | 1 | 1 | 1 | 1 | 0 | 0 | 1 | 1 | 0 | 0 | 1 | 1 | 0 | 0 | 1 |
| 7 | 1 | 0 | 0 | 0 | 1 | 0 | 0 | 0 | 1 | 0 | 0 | 1 | 0 | 0 | 0 | 1 |
| 8 | 1 | 1 | 0 | 0 | 1 | 1 | 0 | 0 | 1 | 1 | 0 | 0 | 0 | 1 | 1 | 0 |
| 9 | 1 | 1 | 1 | 1 | 0 | 1 | 1 | 0 | 1 | 0 | 1 | 1 | 1 | 0 | 1 | 1 |

APPARATUS FOR RECOGNIZING RADIO FREQUENCY IDENTIFICATION (RFID) AND METHOD THEREOF, AND DATA PROCESSING METHOD OF RFID

BACKGROUND OF THE INVENTION (a) Field of the Invention

The present invention relates to a radio frequency identification (RFID) reader, a method thereof, and an RFID data processing method. More particularly, the present invention relates to a radio frequency identification (RFID) reader for reading a plurality of RFIDs at a high speed, a method thereof, and an RFID data processing method.

(b) Description of the Related Art

An RFID system using the RFID includes a reader and a tag, in which the reader queries the tag of an ID and detailed information of the tag through a radio communication link, and the tag receives power needed for processing by the tag from the reader through the radio communication link and applies energy caused by the power to calculation on the tag or communication with the reader. In this instance, the conventional RFID system uses a round having a predetermined number of slots so as to quickly identify a plurality of tags. A slot is a time for the tag to transmit a tag ID as a response, and one slot represents a time for the reader to transmit a specific message and receive a corresponding response.

Goods identification using the RFID system is very useful in the delivery and distribution fields, such as for tracking assets and automatically checking stocks. Particularly, the RFID usage in the delivery and distribution fields attaches an RFID to each product before the product is delivered, and builds product information corresponding to a tag ID of the attached RFID in a database, thereby efficiently managing the products.

Published Korean Application No. 2005-0047670 that uses an RFID discloses "Method and apparatus for reading RFID attached product."

The prior art installs an RFID reader that is movable among products and checks the stock of products in order for a vending machine to read the RFID having various frequencies, and uses a reader at a product outlet to collect sales information, efficiently check stock, and acquire sale volumes.

The conventional RFID system uses a plurality of rounds having a predetermined number of slots so as to identify the RFID attached to the product, and the RFID generates a response depending on the round size of the reader to manage the product.

The conventional RFID system fails to identify a tag ID in the corresponding round and goes to the next round to identify the tag ID when at least two tags having the same slot number in one slot are generated to generate a collision in the radio communication link. That is, when a collision is generated in the corresponding round, the entire tag identifying time for the reader to identify the tag is increased irrespective of the number of tags to be identified.

SUMMARY OF THE INVENTION

The present invention has been made in an effort to provide an RFID reader for identifying a plurality of RFIDs at a high speed, a method thereof, and a method for processing data of an RFID.

In one aspect of the present invention, a method for reading a radio frequency identification (RFID) by an RFID reader reading a plurality of RFIDs includes: a) generating a specific query message to the RFIDs; b) receiving a first response message corresponding to the query message from at least one RFID among the RFIDs; and c) sequentially identifying a tag ID of the collided RFID by using a collision solving message when collision is generated according to the result of receiving the first response. The step of c) includes: c-1) generating a first collision solving message including a preset discrimination code to the RFIDs; c-2) receiving a second response message corresponding to the first collision solving message from at least one RFID among the RFIDs; and c-3) identifying a tag ID based on the second response message when no collision is generated according to the result of receiving the second response message.

In another aspect of the present invention, a method for processing data by a radio frequency identification (RFID) transmitting/receiving data with an RFID reader reading a tag ID includes: a) receiving a query message including round size information from the RFID reader; b) selecting a slot number based on the round size information of the query message; c) generating a first response message including a stored tag ID when the slot number satisfies a specific value; and d) transmitting the first response message to the RFID reader. The step of c) further includes storing the slot number and standing by when the slot number does not satisfy the specific value.

In another aspect of the present invention, a radio frequency identification (RFID) reader for reading a plurality of RFIDs includes: a communicator for transmitting/receiving data to/from the RFID through RF signals; a storage unit for storing predetermined round size information, and storing tag IDs included by the RFIDs and product information matched with the tag IDs; and a controller for controlling the communicator and the storage unit, providing the round size information to the RFIDs, and sequentially identifying the tag IDs of the RFIDs by using a collision solving message when a collision is generated for a specific message received from the RFIDs. The controller includes: a collision state determining module for determining a collision state for the specific message received from the RFIDs; a code managing module including a first storing module for storing a discrimination code and a second storing module for storing a test code, and changing the discrimination code and the test code stored in the first storing module and the second storing module according to a specific control; a tag identifying module for detecting the tag ID based on the specific message received from the RFIDs, and generating a temporary identifier based on the detected tag ID; and a control module for controlling the collision state determining module, the code managing module, and the tag identifying module, generating a collision solving message including the discrimination code based on the collision state of the collision state determining module, and transmitting the collision solving message to the RFIDs through the communicator. The discrimination code includes at least one bit, a specific bit value is added to the discrimination code based on the most significant bit (MSB) among the bit according to a control by the control module, or the discrimination code is updated based on the test code.

In another aspect of the present invention, a method for reading a radio frequency identification (RFID) by an RFID reader reading a plurality of RFIDs includes: a) requesting a tag ID from the RFID; b) receiving a first response message from the RFID; c) generating a collision solving message including the stored discrimination code of 0 to the RFID when a collision is generated according to the received result; d) receiving a second response message corresponding to the collision solving message from the RFID; e) checking whether the MSB of the discrimination code is 1 when a collision is generated according to the result of receiving the second response message; f) adding a bit of 0 to the MSB of the discrimination code and changing it into a first discrimination code when the MSB is not 1 according to the result of checking the MSB; and g) generating a collision solving message including the first discrimination code to the RFID and repeating the steps after d).

BRIEF DESCRIPTION OF THE DRAWINGS

FIG. 7 is a data flowchart of an RFID reading method according to an exemplary embodiment of the present invention.

DETAILED DESCRIPTION OF THE EMBODIMENTS

Figure 1:
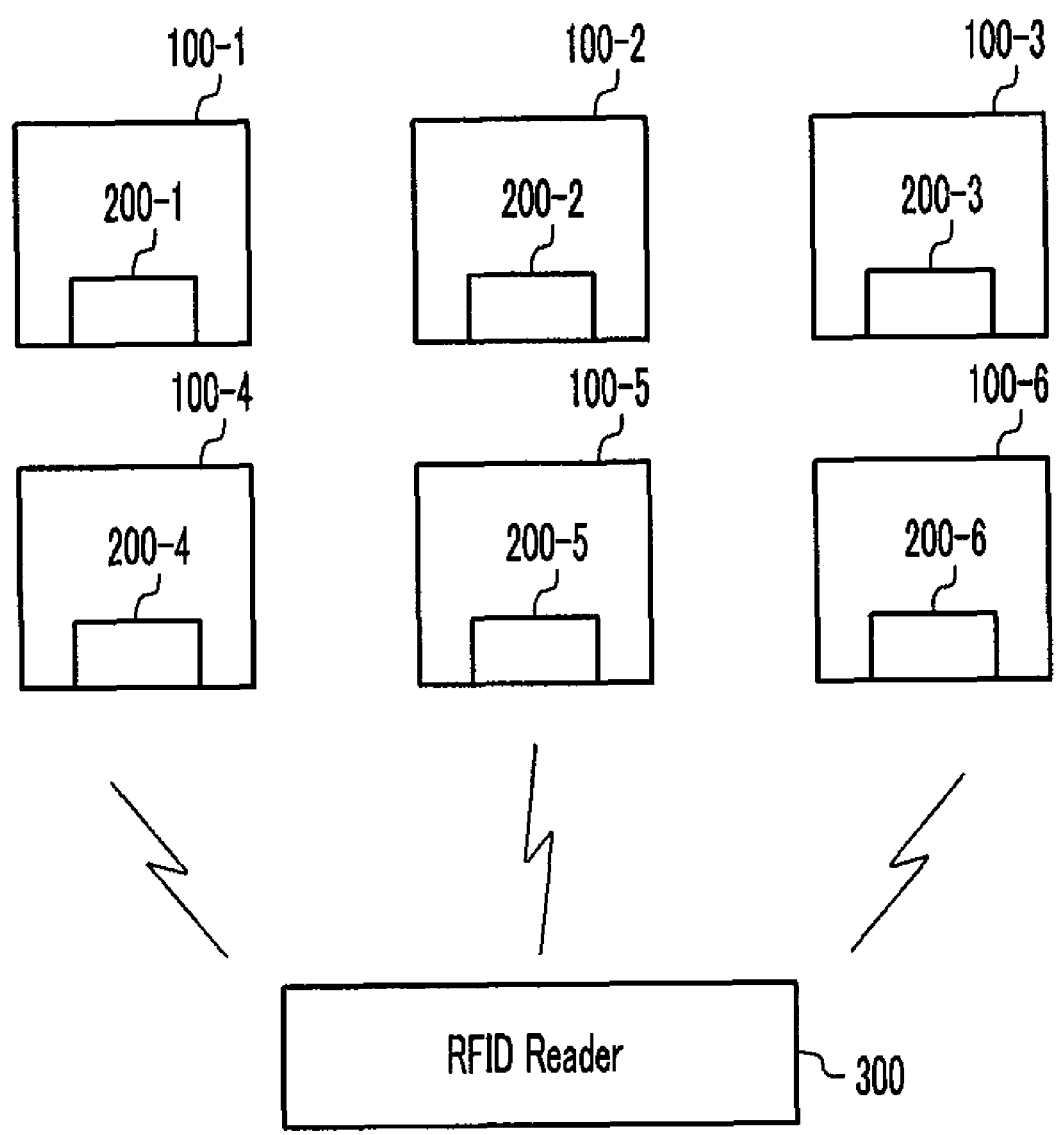
FIG. 1 is a block diagram of an RFID reading system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" or variations such as "comprises" will be understood to imply the inclusion of stated elements but not the exclusion of any other elements.

In addition, the word "module" will be understood to indicate a unit for processing a predetermined function or operation, which may be realized by hardware, software, or a combination thereof.

An RFID reader for identifying a plurality of RFIDs at a high speed, a method thereof, and an RFID data processing method according to an exemplary embodiment of the present invention will now be described in detail with reference to drawings.

FIG. 1 is a block diagram of an RFID reading system according to an exemplary embodiment of the present invention.

As shown in FIG. 1, the RFID reading system includes a plurality of RFIDs 200 and an RFID reader 300 for reading the RFIDs.

The RFID 200 is attached to a plurality of products 100, establishes the slot number based on the round size information received from the RFID reader 300, and transmits a temporary identifier or a tag ID based on the slot number. In this instance, the temporary identifier includes lower 16 bits of the tag ID, and the tag ID is a proper ID of the RFID and has various size bits of 96, 128, or 256 bit according to the RFID.

The RFID reader 300 transmits a query message including a round having a predetermined size to the RFID 200, receives a response message from the RFID 200 according to transmission, and acquires a tag ID by identifying the received message. In this instance, the RFID reader 300 transmits a re-query (QueryRep) message and a collision solving (QueryRepSolve) message to the RFID 200 so as to acquire an accurate tag ID. Here, the round has a predetermined number of slots for quickly identifying the RFIDs, and a slot in this instance is one cycle during which data transmission and receiving (transmission and response) between the RFID 200 and the RFID reader 300 occur.

The RFID reading system has advantages in repeating no new rounds, using a specific message, and sequentially identifying corresponding collision tags, and thereby extracting a spent time and an accurate tag ID when the RFID reader identifies the collision tags.

An RFID reader used for the RFID reading system according to an exemplary embodiment of the present invention will now be described.

Figure 2:
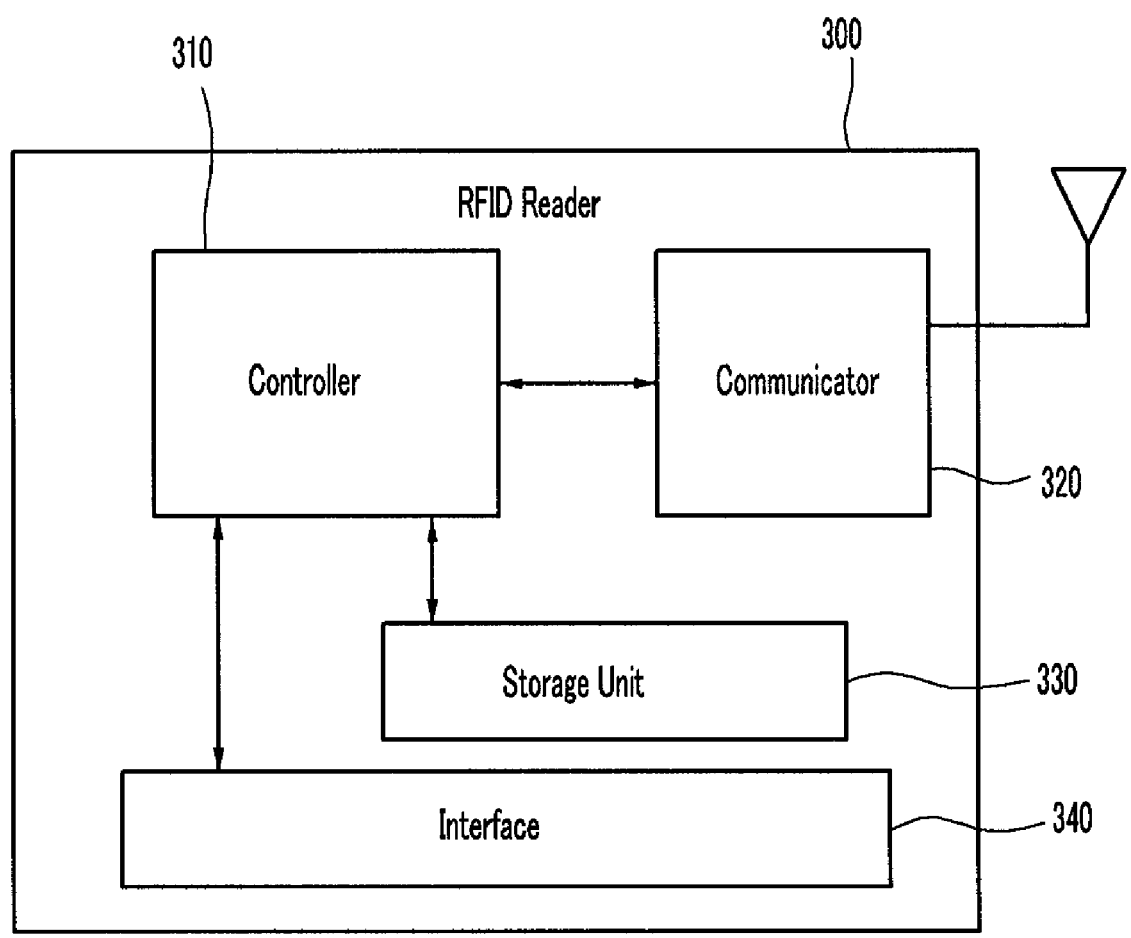
FIG. 2 is a block diagram of an RFID reader according to an exemplary embodiment of the present invention.

FIG. 2 is a block diagram of an RFID reader according to an exemplary embodiment of the present invention.

As shown in FIG. 2, the RFID reader 300 includes a controller 310, a communicator 320, a storage unit 330, and an interface 340.

The RFID reader 300 communicates with the RFIDs 200 shown in FIG. 1 by using RF signals, senses a collision state according to the signal input by the RFID 200, and detects an accurate tag ID of the RFID through a specific message caused by the sensing.

The communicator 320 includes an antenna matching module, an RF module, and a modulation/demodulation module, and communicates with a plurality of RFIDs 200 by using RF signals. The antenna matching module radiates the RF signal to the RFID 200 or receives the RF signal from the RFID 200, the RF module converts the RF signal or converts the received RF signal into a signal of a predetermined bandwidth, and the modulation/demodulation module modulates and demodulates a specific message communicated with the RFID 200.

The storage unit 330 stores specific information according to control by the controller 310. In this instance, the stored specific information includes pre-stored round size information, tag ID information provided by the RFID 200, and product information matched with the tag ID of the RFID 200. Here, the round size information is information on the round size set by a manager, and is set to be a predetermined value that is not too large or too small irrespective of the number of tags to be identified.

The interface 340 includes a specific interface and transmits/receives data with an external system according to control by the controller 310. In this instance, the specific interface includes a serial communication interface, a parallel communication interface, a USB interface, and a network (e.g., Ethernet) interface.

The controller 310 provides round size information to the RFID 200 through the communicator 320 by using a query message, and sequentially identifies the tag ID on the RFID 200 based on the message received from the RFID 200.

Also, the controller 310 senses a collision state according to the signal input by the RFID 200, provides a collision solving message (a re-query message and a collision solving message) to the RFID 200, and sequentially identifies the tag ID of the RFIDs 200 through a response message caused by the provision.

In this instance, the query message includes round size information, the re-query message includes a temporary identifier (lower 16 bits of the tag ID) extracted from the previously identified tag ID, and the collision solving message includes a discrimination code.

Here, the discrimination code is code information for identifying a plurality of RFIDs 200, it includes binary bit sequences, and it has a variable length guaranteeing flexibility, i.e., the length (the number of bits) is increased or reduced as the update is repeated. The discrimination code is set before the collision solving message is transmitted, and it initially has a 1-bit length and increases by 1 bit for each collision of the response message.

The setting of the discrimination code will be described in detail with reference to the table of FIG. 6 and the flowchart of FIG. 7.

In the above, the RFID reader's constituent elements have been described. The RFID reader according to the exemplary embodiment of the present invention sequentially identifies collision tags by using the specific message among the RFIDs that have collided in a round, thereby substantially reducing the time spent on the tag identification and providing high-speed tag ID identification.

The RFID reader's controller will now be described.

Figure 3:
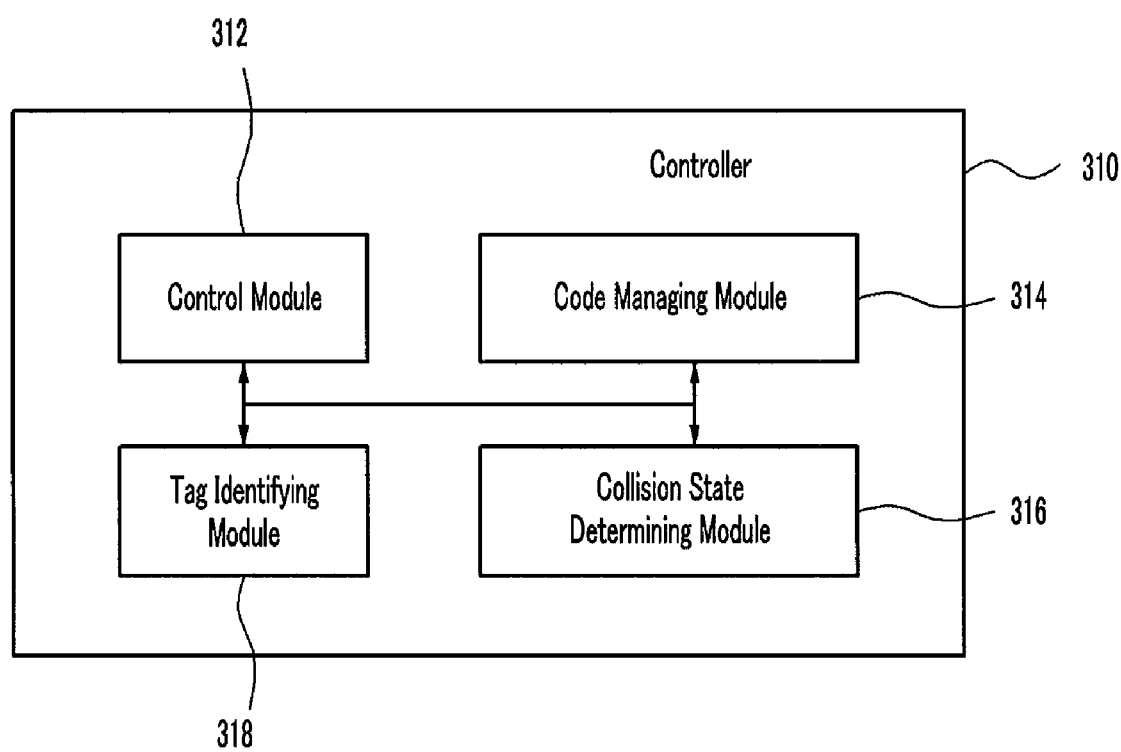
FIG. 3 is a block diagram of a controller of an RFID reader according to an exemplary embodiment of the present invention.

FIG. 3 is a block diagram of a controller of an RFID reader according to an exemplary embodiment of the present invention.

As shown in FIG. 3, the controller 310 of the RFID reader 300 includes a code managing module 314, a collision state determining module 318, a tag identifying module 316, and a control module 312, and it efficiently determines the collision state and efficiently identifies the RFID 200 caused by collision and shown in FIG. 1.

The code managing module 314 includes a discrimination code storing buffer for storing the discrimination code and a test code storing buffer for storing the test code to store the discrimination code and the test code, and it changes the discrimination code and the test code according to control by the control module 312. In this instance, the test code storing buffer is a FILO (First Input Last Out) buffer, and the test code is generated based on the setting code.

The collision state determining module 318 determines collision based on the condition in which a received level of the signal of the RFID 200 received to the communicator 320 shown in FIG. 2 is greater than a predetermined level, or determines collision caused by a format test on the tag ID of the received RFID signal, and provides a determination result to the control module 312.

The tag identifying module 316 detects the tag ID based on the received signal of the RFID 200, and generates a temporary identifier (lower 16 bits of the tag ID) based on the detected tag ID.

The control module 312 controls operations of the respective elements of the RFID reader 300, generates a specific message including a temporary identifier or round size information, and transmits the specific message to the RFID 200 through the communicator 320 so as to detect the tag ID of the RFID 200.

Also, the control module 312 generates a collision solving message including the discrimination code based on the collision state of the collision state determining module 318, and transmits the same to the RFID 200 through the communicator 320.

Figure 4:
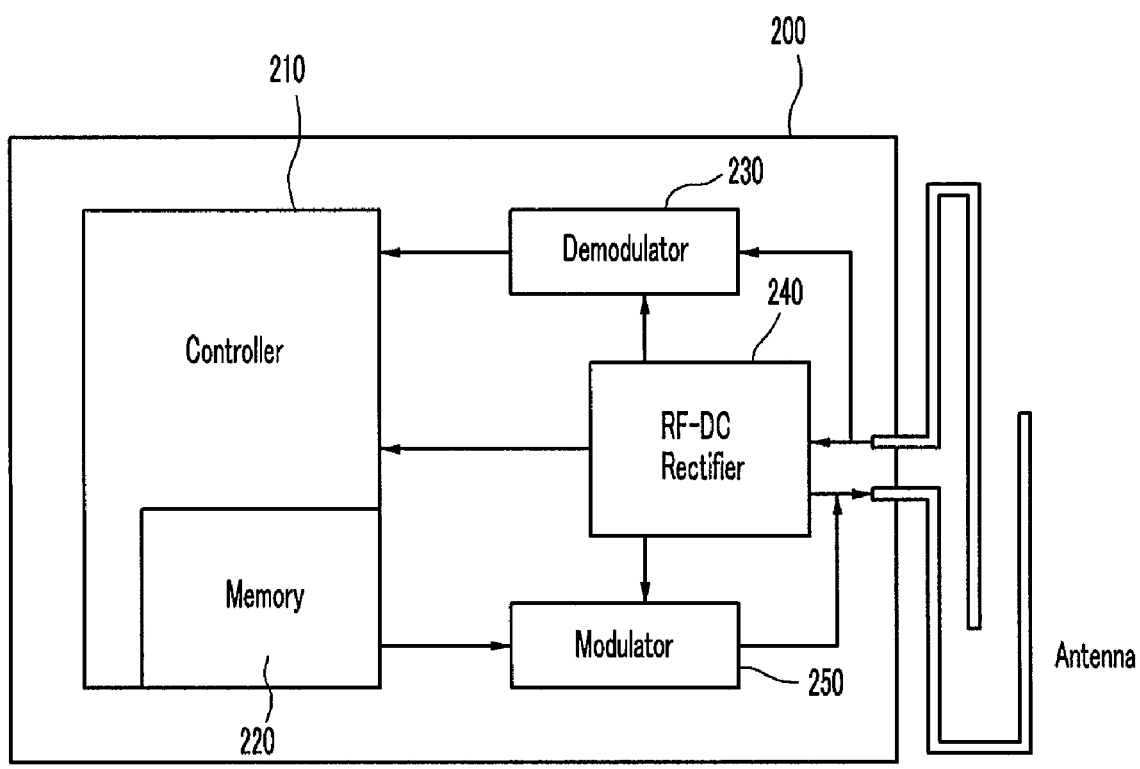
FIG. 4 is a block diagram of an RFID according to an exemplary embodiment of the present invention.

FIG. 4 is a block diagram of an RFID according to an exemplary embodiment of the present invention.

As shown in FIG. 4, the RFID 200 includes a demodulator 230, an RF-DC rectifier 240, a modulator 250, a controller 210, a memory 220, and an antenna.

The demodulator 230 receives and demodulates the specific message received from the RFID reader 300 of FIG. 2 from the antenna.

The RF-DC rectifier 240 generates power from the continuous waveform (CW) signal received from the RFID reader 300, and supplies power to the demodulator 230, the modulator 250, the controller 210, and the memory 220.

The modulator 250 modulates the specific message received from the controller 210 and transmits the modulated message to the RFID reader 300 through the antenna.

The antenna transmits/receives the RF signal, provides the RF signal to the demodulator 230, and radiates the signal received from the modulator 250.

The controller 210 randomly selects a slot number based on the round size information of the query message received from the RFID reader 300, and generates a response message including a tag ID when the slot number according to selection is given "0."

In this instance, the controller 210 randomly selects a slot number within the round size range, and the round size range is given between "0" and "the round size −1."

Also, the controller 210 reduces the slot number based on the re-query (QueryRep) message received from the RFID reader 300, and generates a response message including the tag ID when the slot number satisfies "0" according to the reduction.

Also, the controller 210 compares the discrimination code and the temporary identifier based on the collision solving (QueryRepSolve) message received from the RFID reader 300, and generates a response message including a temporary identifier (including lower 16 bits of the tag ID) when the discrimination code corresponds to the temporary identifier according to the comparison. In this instance, the standby state is maintained when the discrimination code does not correspond to the temporary identifier.

Figure 5:
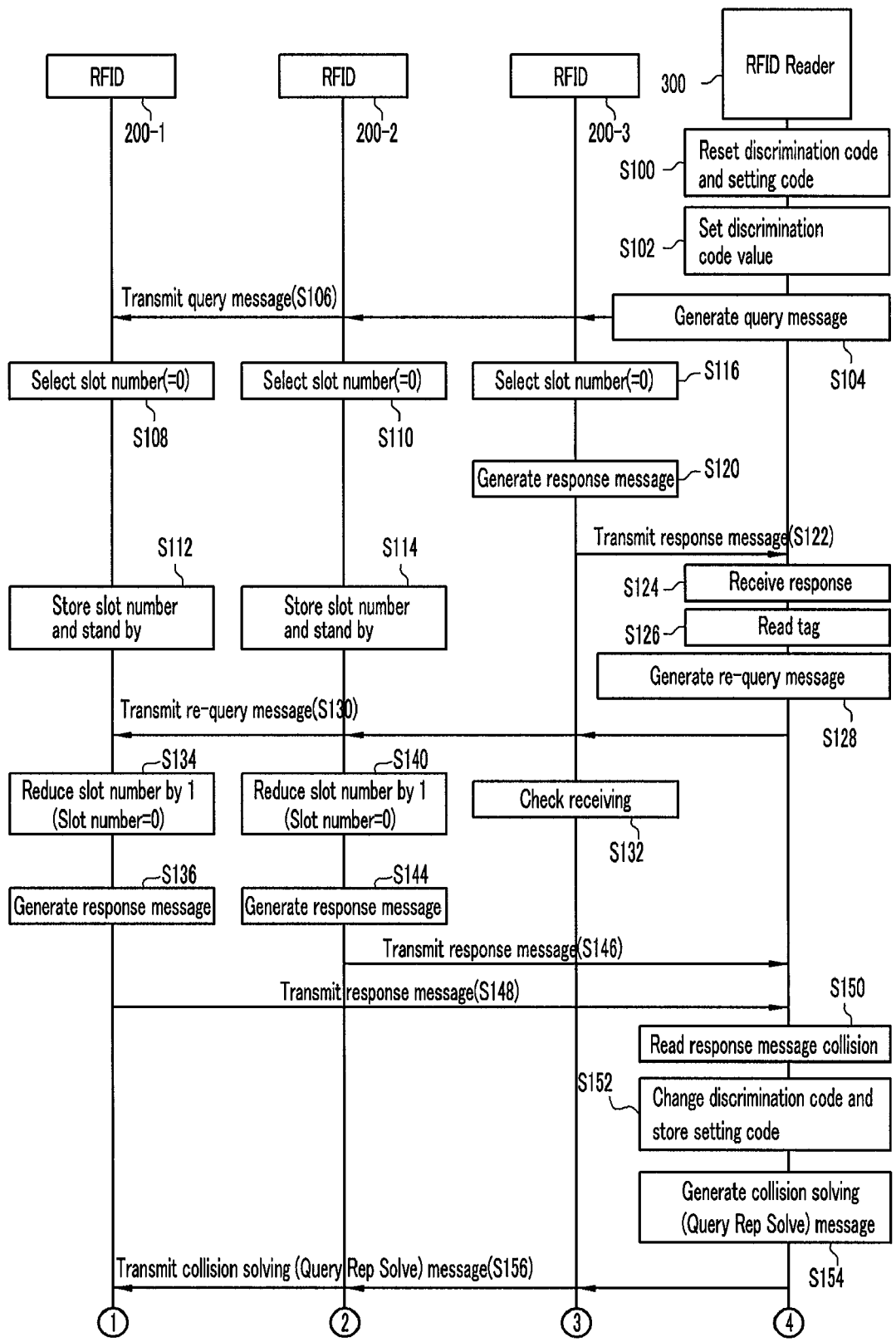
FIG. 5 and FIG. 6 are block diagrams of a controller of an RFID according to an exemplary embodiment of the present invention.

FIG. 5A and FIG. 5B are a data flowchart of an RFID reading method according to an exemplary embodiment of the present invention.

As shown in FIG. 5A and FIG. 5B, regarding the RFID reading method, the RFID reader 300 generates a query message for identifying RFIDs (200-1, 200-2, 200-3) (S104), and transmits the generated message to the RFIDs (200-1, 200-2, 203) (S106).

In this instance, the RFID reader 300 resets the discrimination code and the test code stored in the discrimination code buffer and the test code buffer before generating a query message (S100), and stores the discrimination code set to be "0" in the discrimination code buffer (S102).

In this instance, the query message generated by the RFID reader 300 includes size information of the stored round.

The RFIDs (200-1, 200-2, 200-3) receive the query message from the RFID reader 300, and randomly select a slot number based on the round size information (S108, S110, S116).

When the selected slot number selected by the RFID 200-3 is "0," a response message is generated based on the tag ID included by the RFID 200-3 and the response message is transmitted to the RFID reader 300 (S120, S122).

In this instance, when the slot number selected by the RFIDs (200-1, 200-2) is not "0," the RFIDs (200-1, 200-2) store the slot number and stand by (S112, S114).

The RFID reader 300 receives the response message from the RFID 200-3, and determines collision of the received response message (S124).

When the response message is determined to be a response message without an error, the RFID reader 300 identifies the tag ID from the received response message, and generates a temporary identifier including the lower 16 bits of the tag ID (S126).

In this instance, when the received response message is at least two response messages or an error generated message, steps after S150 are performed.

The RFID reader 300 generates a re-query (QueryRep) message including the generated temporary identifier (S128), and transmits the re-query message to the RFIDs (200-1, 200-2, 200-3) (S130).

Transmission of the re-query (QueryRep) message notifies the RFID 200-3 having a temporary identifier of receiving of the tag ID, and simultaneously notifies the RFIDs (200-1, 200-2) that the previous slot is closed and a new slot is started, in order to query whether the RFIDs (200-1, 200-2) for transmitting the tag ID are provided.

The RFID 200-3 receives the re-query (QueryRep) message from the RFID reader 300 (S132), determines whether the temporary identifier included in the re-query (QueryRep) message corresponds to the low-order bit of the tag ID, digresses from the round, and generates no response to the re-query (QueryRep) message or the collision solving (QueryRepSolve) message transmitted from the RFID reader 300 when the temporary identifier corresponds to the low-order bit of the tag ID.

The RFIDs (200-1, 200-2) receive the re-query (QueryRep) message from the RFID reader 300, determine whether the temporary identifier included in the re-query (QueryRep) message corresponds to the temporary identifier generated by the tag ID, and when they are not the same, the RFIDs reduce the slot number by 1, and compare and determine whether the next slot number is 0 (S134, S140).

When the slot number is 0, the RFIDs (200-1, 200-2) generate a response message including a tag ID (S136, S144), and transmit the generated response message to the RFID reader 300 (S146, S148). In this instance, when the slot number is not 0, the RFID 300 stores the slot number and stands by.

In this instance, when receiving no response message on the query (Query) message or the re-query (QueryRep) message from the RFID, the RFID reader 300 closes the current slot after a predetermined time (i.e., a sufficient time for receiving the response message that is a response to the query (Query) message or the re-query (QueryRep)), generates a re-query (QueryRep) message for identifying the tag in the next slot, and transmits the message to the RFID (200-1, 200-2, 200-3). In this instance, since the re-query (QueryRep) message has no tag ID received from the previous slot, no temporary identifier of the previous tag ID is included therein.

The RFID reader 300 receives the response message from the RFIDs (200-1, 200-2), and determines collision of the received response message (S150).

On checking the collision of the response message, the RFID reader 300 identifies the tag IDs one by one according to the collision tag identifying process. In this instance, the RFID reader's 300 checking of the response message collision is known by checking the received level of the received signal. The response collision is generated when a plurality of response messages are simultaneously received, and hence, when a signal greater than twice the case in which a response message is received is detected, it is sensed as response message collision. Also, when the tag ID format included by the response message has an unidentified error (based on a predetermined error table) after demodulating the received signal and checking the error, it is sensed as response message collision.

The RFID reader 300 generates a collision solving (QueryRepSolve) message including the stored discrimination code (=0) according to the response message collision and transmits the same to the RFIDs (200-1, 200-2, 200-3) (S154, S156).

Here, the discrimination code has binary bit sequences, and has a variable length guaranteeing flexibility, i.e., the length (the number of bits) is increased or reduced as the update is repeated. The discrimination code is set before the collision solving message is transmitted, and it initially has a 1-bit length and increases 1 bit for each collision of the response message.

The bit value included by the discrimination code is initially set to be 0 with 1 bit, and is updated when the tag IDs are collided or normally received. Also, when tag collision is generated according to the response message, the bit value included by the discrimination code adds a 1-bit most significant bit (MSB) to the bit value of the current discrimination code after the initial collision message. In this instance, when a right tag ID is received, the MSB of the bit value included by the current discrimination code is set in a different manner. That is, the MSB is changed to the binary number of 1 when the MSB of the bit value included by the current discrimination code is 0, and the discrimination code is updated with the test code stored in the test code buffer when the MSB of the bit value included by the current discrimination code is 1. Setting of the discrimination code will be described with reference to the table of FIG. 6.

The RFIDs (200-1, 200-2) receive the collision solving message, compare the discrimination code (=0) included in the collision solving message and the least significant bit (LSB) of the temporary identifier (lower 16 bits of the tag ID) included by the RFIDs (200-1, 200-2), and generate a response message including the tag ID to the RFID reader 300 (S162, S164) when the comparison results are matched (S158, S160).

In this instance, when the discrimination code does not correspond to the temporary identifier (lower 16 bits of the tag ID), the RFIDs (200-1, 200-2) stand by.

The RFID reader 300 receives a response message from the RFIDs (200-1, 200-2) (S168), reads that the received response message is collided (S170), changes the discrimination code of 0 with the MSB 1 bit added value of 00, generates a test code of 01 based on the MSB included by the discrimination code, and stores the same in the test code buffer (S172). In this instance, a detailed description on the change of the discrimination code will be described with reference to the table of FIG. 6.

A collision solving (QueryRepSolve) message including the changed discrimination code (=00) is generated to the RFIDs (200-1, 200-2, 200-3) (S174, S176).

The RFID 200-2 receives the collision solving message, compares the discrimination code (=00) included in the collision solving message and the LSB of the temporary identifier (lower 16 bits of the tag ID) included by the RFID 200-2, and when they are matched (S180), the RFID 200-2 generates a response message including a tag ID to the RFID reader 300 (S186, S188).

In this instance, the RFID 200-2 maintains standing by when the discrimination code does not correspond to the temporary identifier (lower 16 bits of the tag ID) (S178, S182).

The RFID reader 300 receives a response message corresponding to the collision solving message from the RFID to determine collision (S190), and reads the tag ID when no collision occurs (S192).

The RFID reader 300 changes the discrimination code to 01 based on the test code of 01 stored in the test code buffer according to the MSB of the discrimination code of 00 (S194).

*The RFID reader 300 generates a collision solving message (Query RepSolve) including the changed discrimination code to the RFIDs (200-1, 200-2, 200-3) (S196, S198).

The RFID 200-1 receives the collision solving message, compares the discrimination code (=01) included in the collision solving message and the LSB of the temporary identifier (lower 16 bits of the tag ID) included by the RFID 200-1, and transmits a response message including the tag ID to the RFID reader 300 (S200, S202).

In this instance, the RFID 200-1 stands by when the discrimination code does not correspond to the temporary identifier.

The RFID reader 300 receives the response message from the RFIDs (200-1, 200-2), and reads the tag ID included in the received response message (S206).

When the collided response message is generated, the RFID reader detects that the RFID ID has collided in a round through the collision tag identifying process.

A process for the RFID reader to identify the collision tag according to an exemplary embodiment of the present invention tag will now be described with reference to the table of FIG. 6.

Figure 6:
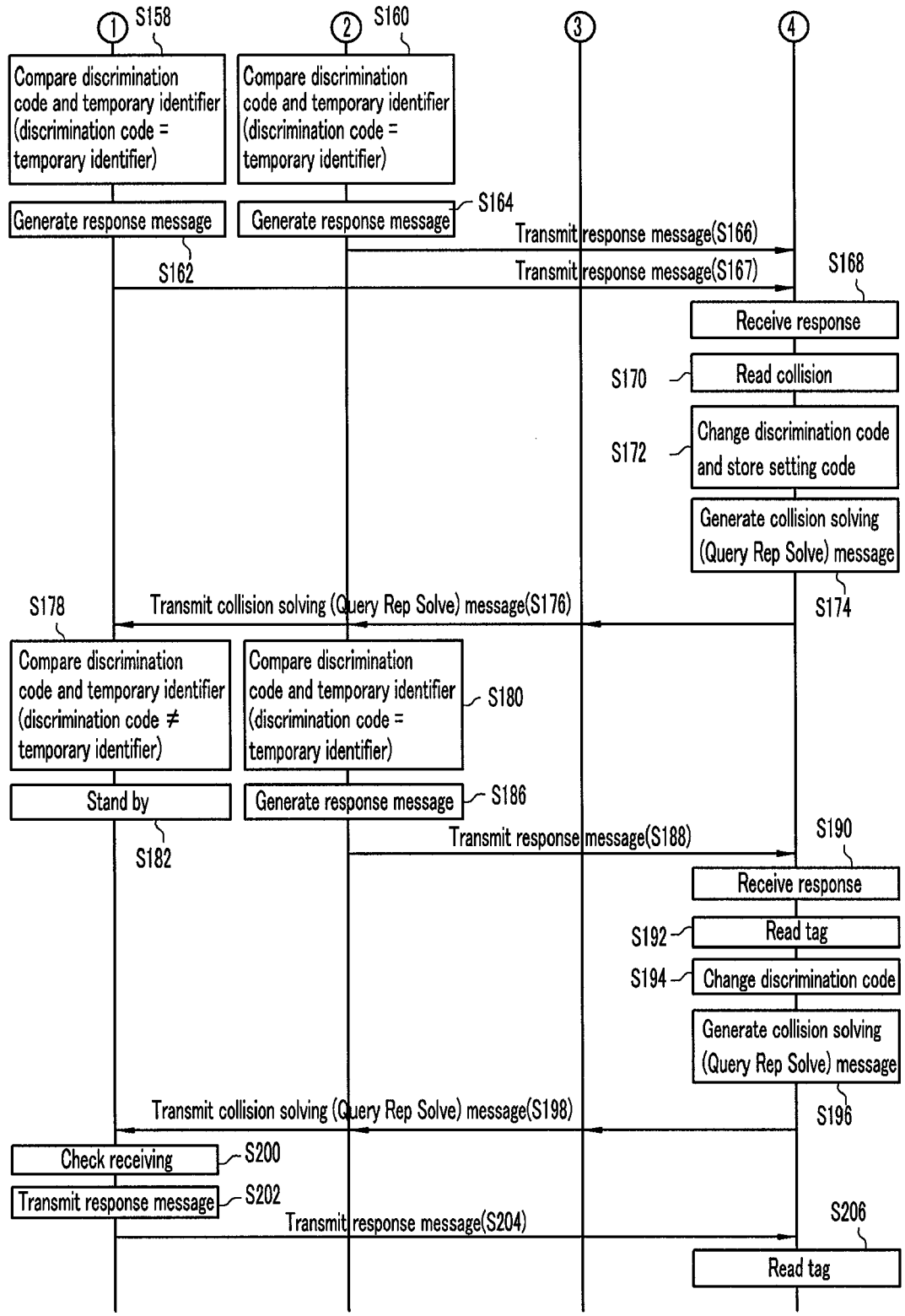
Figure 8:
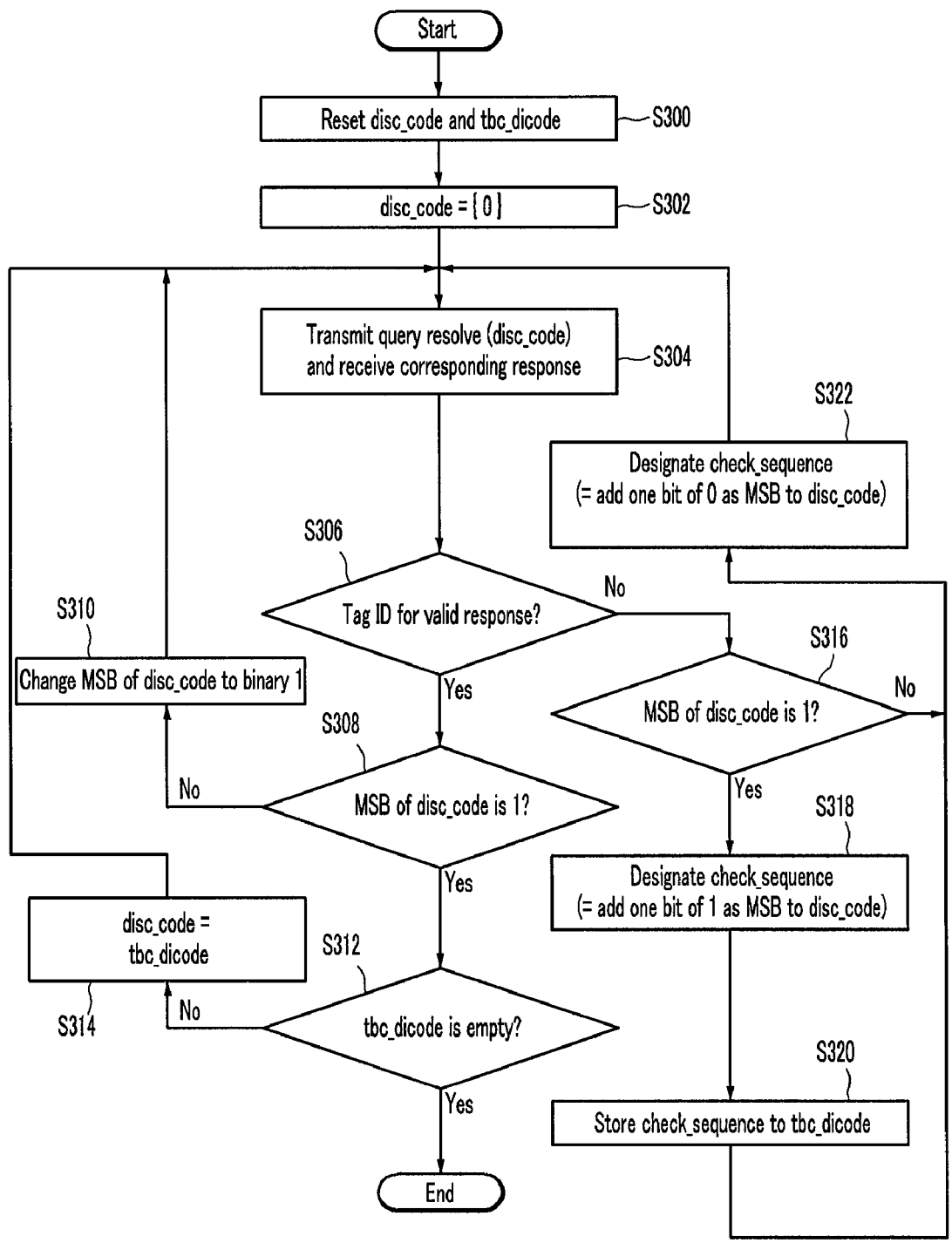
FIG. 8 is a flowchart of an RFID reading method according to an exemplary embodiment of the present invention.

FIG. 6 is a table for an identifying order and result according to the collision identifying process by the RFID reader according to an exemplary embodiment of the present invention.

As shown in FIG. 6, the RFID reader 300 performs the collision tag identification process while transmitting/receiving data with a plurality of RFIDs 200 shown in FIG. 1, and acquires a temporary identifier given in the table.

In this instance, the RFID reader 300 receives response messages simultaneously transmitted by nine RFIDs 200 at a random slot to read tag collision, and performs a collision tag identifying process. Here, the nine RFIDs 200 are assumed to have a temporary identifier (lower 16 bits of the tag ID) as shown in FIG. 6.

The RFID reader 300 generates a first collision solving (QueryRepSolve) message including a discrimination code (disc_code) set to be 0 to the RFID 200.

The RFID 200 receives the collision solving (QueryRepSolve) message, compares the discrimination code (disc_code) of the received collision solving message and the LSB as long as the length of the discrimination code (disc_code) among the temporary identifier of the tag ID, and determines whether they are matched. The RFID 1 (200-1) to RFID 6 having the same discrimination code and the lower bits of tag ID simultaneously transmit their tag IDs in response.

The RFID reader 300 receives response messages from the RFID1 (200-1) to RFID 6, reads corresponding tag collision, sets the sequence of 1 that is generated by changing the MSB of the discrimination code (disc_code) to 1 as a test code (tbc_dicode), and stores the test code in the test code buffer. Here, the tag number is assumed to be a random number included by the RFID 200.

As the response message collision is generated, the RFID reader 300 considers that the previous response is collided for the second collision solving (QueryRepSolve) message, adds a bit of 0 to the MSB of the discrimination code (disc_code), sets a new discrimination code (disc_code) of 00 that is generated by adding the one bit of 0 to the MSB, and transmits a collision solving message generated by the setting to the RFID 200.

When the RFID1 200-1 and the RFID2 200-2 simultaneously transmit their tag IDs to the collision solving (QueryRepSolve) message (discrimination code=00), the RFID reader 300 reads tag collision again. The RFID reader 300 sets the sequence of 01 that is generated by changing the MSB of the discrimination code (disc_code) to 1, to be a test code (tbc_dicode), and stores the test code in the test code buffer. In this instance, the test code buffer has two test code sequences (01, 1) including the previously input test code. Since the test code buffer storing the test code is the FILO (First Input Last Output) type, the sequence of 01 that is input later receives a higher priority.

The RFID reader 300 additionally sets the bit of 0 of the discrimination code (disc_code) to be 000 so as to generate a third collision solving (QueryRepSolve) message, generates the collision solving message including the set discrimination code, and transmits the same to the RFID 200.

The RFID1 200-1 having the same bit sequence as a temporary identifier transmits its tag ID. Therefore, the first tag ID is read by the RFID reader 300.

Since the tag ID is identified by the discrimination code (disc_code) having the MSB of 0 through the third collision solving message transmission, the RFID reader 300 generates a new discrimination code (disc_code) of 001 that is generated by changing the MSB of the current discrimination code (disc_code) to 1 for the fourth collision solving (QueryRepSolve) message. The RFID reader 300 transmits the collision solving message having the generated discrimination code of 001 to the RFID 200. After this, the RFID2 200-2 having the same sequence transmits its tag ID in response to the collision solving message.

The RFID reader 300 prepares the fifth collision solving (QueryRepSolve) message. Since the right tag ID is received and the MSB of the discrimination code (disc_code) is 1, the RFID reader 300 reads 01 having a high priority from among the test code (tbc_dicode) stored in the test code buffer as a new discrimination code (disc_code), and generates the fifth collision solving message to the RFID 200. In this instance, the test code buffer eliminates the test code (tbc_dicode) of 01 that is a used bit sequence.

The RFID3 200-3 to RFID6 200-6 having the same sequence as that of the discrimination code (disc_code) for the collision solving (QueryRepSolve) message (disc_code=01) simultaneously transmit tag IDs, and the RFID reader 300 reads tag collision.

As response message collision is generated, the RFID reader 300 adds the bit of 0 to the MSB of the discrimination code (disc_code) to set a new discrimination code (disc_code) of 010 for the sixth collision solving (QueryRepSolve) message, and generates the sixth collision solving message including the set discrimination code to the RFID 200.

The RFID3 200-3 among the RFIDs 200 having a temporary identifier of the same sequence as 010 transmits its tag ID for the sixth collision solving (QueryRepSolve) message, and hence, the tag ID is rightly identified by the RFID reader 300.

As the tag ID is rightly identified, the RFID reader 300 sets the discrimination code (disc_code) for the seventh collision solving (QueryRepSolve) message to be 011 in a like manner of the process for the discrimination code (disc_code) for the fourth collision solving (QueryRepSolve) message, and generates the seventh collision solving message including the set discrimination code to the RFID 200.

The RFID4 200-4 to the RFID6 200-6 having the same temporary identifier of the sequence as 011 for the seventh collision solving (QueryRepSolve) message simultaneously respond.

The RFID reader 300 reads tag collision according to the response by the RFID4 200-4 to RFID6 200-6.

As response message collision is generated, the RFID reader 300 sets the discrimination code (disc_code) for the eighth collision solving (QueryRepSolve) message to be 0110 in a like manner of the second collision solving (QueryRepSolve) message, and generates the eighth collision solving message to the RFID 200.

The RFID4 200-4 only responds to the eighth collision solving message, no collision is generated, and the tag ID is identified as a right one.

*According to the right tag ID identification, the RFID reader 300 sets the discrimination code (disc_code) for the ninth collision solving (QueryRepSolve) message to be 0111 based on the same method for the fourth collision solving (QueryRepSolve) message, and generates the ninth collision solving message to the RFID 200.

The RFID5 200-5 and the RFID6 200-6 simultaneously respond to the ninth collision solving message to generate collision.

As collision is generated, the RFID reader 300 sets the discrimination code (disc_code) for the tenth collision solving (QueryRepSolve) message to be 01110 based on the same method for the second collision solving (QueryRepSolve) message, and generates the tenth collision solving message to the RFID 200.

The RFID5 200-5 only responds to the tenth collision solving message, and the tag ID is identified as a right one by the RFID reader 300.

According to the right tag ID identification, the RFID reader 300 sets the discrimination code(disc_code) for the eleventh collision solving (QueryRepSolve) message to be 01111 based on the same method for setting the discrimination code(disc_code) for the fourth collision solving (QueryRepSolve) message, and generates the eleventh collision solving message to the RFID 200.

The RFID6 200-6 only responds to the eleventh collision solving message, and the tag ID is identified as a right one by the RFID reader 300.

According to the right tag ID identification, the RFID reader 300 sets the test code (tbc_dicode) of 1 that is a bit sequence stored in the test code buffer to be a new discrimination code (disc_code) based on the same method for setting the discrimination code (disc_code) for the fifth collision solving (QueryRepSolve) message for the twelfth collision solving (QueryRepSolve) message, and generates the twelfth collision solving message including the new discrimination code to the RFID 200.

The RFID7 200-7 to the RFID9 200-9 simultaneously transmit their tag IDs in response to the twelfth collision solving message. The RFID reader 300 cannot identify the responses but reads generation of collision.

An identification process for them is sequentially performed by the RFID reader. The discrimination code for the thirteenth collision solving (QueryRepSolve) message uses the same method for setting the discrimination code (disc_code) for the second collision solving (QueryRepSolve) message, and the discrimination code (disc_code) is set to be 10. The response by the RFID7 200-7 to this is identified as a right tag ID without collision.

The discrimination code (disc_code) for the fourteenth collision solving (QueryRepSolve) message is set to be 11 according to the same method for setting the discrimination code (disc_code) for the fourth collision solving (QueryRepSolve) message. When the RFID8 200-8 and the RFID9 200-9 simultaneously transmit their tag IDs in response to this, the RFID reader 300 checks another tag collision condition on the radio channel.

The RFID reader 300 sets the bit sequence of 110 that is updated according to the same method for the second collision solving (QueryRepSolve) message to a new discrimination code (disc_code) for the fifteenth collision solving (QueryRepSolve) message. The response by the RFID8 200-8 to this is identified as a right tag ID without collision.

The discrimination code (disc_code) for the collision solving (QueryRepSolve) message is set to be 111 according to the same method for setting the discrimination code (disc_code) for the fourth collision solving (QueryRepSolve) message. The response by the RFID9 200-9 is identified as a right tag ID without collision.

The nine collision RFIDs that are generated at a random slot through the identification process are identifiable by sixteen collision solving (QueryRepSolve) messages and corresponding responses, that is, sixteen question and answer times (equal to sixteen slot times) through the discrimination code (disc_code) that is flexibly set and has a variable length.

On the contrary, in the same condition, the conventional method uses the 16 bits to be compared or part of the 16 bits (i.e., 2 bits, 3 bits, 4 bits, 5 bits, and 8 bits) to be compared, and hence, it is needed to query all the sub-slots formed by them.

Therefore, 32 (=4 sub-slots×8 groups) queries are required when the 2 bits are to be compared, 64 (=16 sub-slots×4 groups) queries are required when the 4 bits are to be compared, and 128 (=64 sub-slots×2 groups) queries are required when the 8 bits are to be compared. Each tag transmits its tag ID from a sub-slot that is designated to be the number of bits to be compared among the temporary identifier of the tag.

For example, when the first 4 bits (first group) are 1100 among the temporary identifier of a predetermined tag, the corresponding tag transmits its tag ID from the thirteenth sub-slot of the first group. The tag transmits its tag ID once for each group by as many as the number of groups, and the reader checks the response when one of them is rightly read. Therefore, up to 32 to 65535 times question and answer time (equal to 64 slot times) may be used.

Hence, according to the identification process of the present invention, a tag group to be identified is identifiable by a medium size (e.g., 32) round, an unnecessary time that is spent by an excessive generation of no response slot size caused by setting a very large round or a round repetition caused by setting a small round can be reduced, and hence, the tag identification on the given tag group can be further quickly performed by a single round.

FIG. 7 is a flowchart for a discrimination code setting method based on the RFID reader's reading collision tag according to an exemplary embodiment of the present invention.

As shown in FIG. 7, when a collision is generated at the response message received from the RFID 200, the RFID reader 300 transmits a collision solving message to the RFID 200, receives a corresponding response, and sets a discrimination code.

The RFID reader 300 resets the test code (tbc_dicode) and the discrimination code (disc_code) stored in the discrimination code buffer and the test code buffer (S300), and sets the discrimination code to be 0 (S302) as the RFID reader 300 is operated. The discrimination code and the test code are valid in a slot interval, and they are reset and reused in the next slot. The tag ID of the RFID 200 is collected through a query message and a re-query message.

When the RFID reader 300 senses a collision state while receiving a response message of the RFID 200 while collecting the tag ID of the RFID 200, the RFID reader 300 generates a collision solving message including the discrimination code of 0 to the RFID 200, and receives a corresponding response message (S304).

The RFID reader 300 analyzes the received response message to determine whether the response message includes a tag ID (S306), and then determines whether the MSB included by the discrimination code stored in the RFID reader 300 is 1 when there is a valid tag ID (S308). In this instance, the valid tag ID is a valid tag ID with a response message that is not collided.

The RFID reader 300 determines whether the test code is stored in the test code buffer when the MSB is 1, and it terminates reading the RFID when the test code is not stored therein (S312). In this instance, the case of termination represents that the RFID reader 300 has gathered all the tag IDs of the RFID.

When the test code is stored in the test code buffer in the step of S308, the RFID reader 300 changes the discrimination code into the test code, generates a collision solving message including the changed discrimination code to the RFID 200 (S314), receives a response message of the RFID 200, and repeats the steps after S304.

When the MSB is not 1 in the step of S308, the RFID reader 300 changes the MSB of the discrimination code into the binary number of 1, generates a collision solving message including the changed discrimination code to the RFID 200 (S310), receives a response message of the RFID 200, and repeats the steps after the S304.

When it is not a valid tag ID in the step of S306, it is determined whether the MSB of the discrimination code is 1 (S316), and when the MSB is not 1, the RFID reader 300 generates a discrimination code by adding the 1 bit of 0 to the MSB of the discrimination code (S322), generates a collision solving message including the changed discrimination code to the RFID 200, receives a response message of the RFID, and repeats the steps after the step of S306.

When the MSB of the discrimination code is 1 in the step of S316, the RFID reader 300 stores the test code (tbc_dicode) that is generated by performing a check sequence (Check_Sequence) (i.e., 1 bit of 1 is added to the MSB of the discrimination code) on the discrimination code into the test code buffer (S318, S320), generates a changed discrimination code by adding 1 bit of 1 to the discrimination code, generates a collision solving message including the changed discrimination code to the RFID 200, receives a response message of the RFID 200 according to the transmission, and repeats the steps after the step of S306.

Through the RFID reader's changing the discrimination code, the tag ID of the RFIDs collided at a random slot in the round can be quickly discriminated.

The above-described exemplary embodiment of the present invention is not only realized by the method and apparatus, but is also realized by a program for realizing functions corresponding to the configuration of the exemplary embodiment of the present invention or a recording medium recoding the program, which will be easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Since the RFID reading system can eliminate an unnecessary time such as an excessive generation of no response slots or repetition of rounds through the sequential identification process on the collided RFIDs, a plurality of RFID IDs can be quickly and accurately identified.

What is claimed is:

1. A method for reading a radio frequency identification (RFID) by an RFID reader reading a plurality of RFIDs, the method comprising:
   a) generating a specific query message to the RFIDs;
   b) receiving a first response message corresponding to the query message from at least one RFID among the RFIDs, wherein the RFIDs receive the specific query message including round size information from the RFID reader and randomly select a slot number based on the round size information of the specific query message; and
   c) sequentially identifying a tag ID of the collided RFID by using a collision solving message when collision is generated according to the result of receiving the first response.

2. The method of claim 1, wherein c) comprises:
   c-1) generating a first collision solving message including a preset discrimination code to the RFIDs;
   c-2) receiving a second response message corresponding to the first collision solving message from at least at least one RFID among the RFIDs; and
   c-3) identifying a tag ID based on the second response message when no collision is generated according to the result of receiving the second response message.

3. The method of claim 2, wherein when a collision is generated according to the result of receiving the second response message in c-3), the method comprises:
   i) changing the first discrimination code;
   ii) generating a second collision solving message including the changed first discrimination code to the RFIDs;
   iii) receiving a third response message corresponding to the second collision solving message from at least one RFID among the RFIDs;
   iv) receiving a fourth response message that is not collided from an RFID among the RFIDs by repeating iv) to the vi) when a collision is generated according to the result of receiving the third response message; and v) identifying the tag ID based on the fourth response message.

4. The method of claim 3, wherein i) comprises: storing the first discrimination code as a first test code; and adding a specific bit to the most significant bit (MSB) among the bits of the first discrimination code to change the first discrimination code.

5. The method of claim 4, wherein iv) comprises:
   when no collision is generated according to the result of receiving the third response message,
   generating a second discrimination code based on the first test code;
   generating a third collision solving message to the RFIDs based on the second discrimination code;
   receiving a fifth response message based on the third collision solving message from at least one RFID among the RFIDs; and
   identifying a tag ID based on the fifth response message when no collision is generated according to the result of receiving the fifth response message.

6. The method of claim 5, comprising:
when a collision is generated according to the result of receiving the fifth response message,
1) changing the second discrimination code;
2) generating a fourth collision solving message including the changed second discrimination code to the RFIDs;
3) receiving a sixth response message corresponding to the fourth collision solving message from at least one RFID among the RFIDs;
4) receiving a seventh response message that is not collided from at least one RFID among the RFIDs by repeating 1) to 3) when a collision is generated according to the result of receiving the sixth response message; and
5) identifying the tag ID based on the seventh response message.

7. The method of claim 6, wherein the step of changing the second discrimination code comprises adding a specific bit to the MSB of the bits of the second discrimination code and changing the second discrimination code.

8. The method of claim 6, wherein when no collision is generated according to the result of receiving the sixth response message, the method comprises identifying a tag ID based on the sixth response message.

9. The method of claim 1, wherein when no collision is generated according to the result of receiving the response message in c), the method comprises:
i) identifying a tag ID based on the first response message;
ii) generating a temporary identifier based on the identified tag ID;
iii) generating a re-query message including the temporary identifier to the RFID;
iv) receiving a second response message based on the re-query message from the RFID;
v) determining a collision state of the received second response message; and
vi) sequentially detecting a tag ID of the collided RFID when a collision is generated according to the collision state determination.

10. The method of claim 9, wherein the temporary identifier includes at least 16 bits among the bits of the identified tag ID.

11. A method for processing data by a radio frequency identification (RFID) transmitting/receiving data with an RFID reader reading a tag ID, the method comprising:
a) receiving a query message including round size information from the RFID reader;
b) randomly selecting a slot number based on the round size information of the query message;
c) generating a first response message including a stored tag ID when the slot number satisfies a specific value; and
d) transmitting the first response message to the RFID reader.

12. The method of claim 11, wherein c) comprises storing the slot number and standing by when the slot number does not satisfy the specific value.

13. The method of claim 12, further comprising, after d):
receiving a re-query message including a first temporary identifier from the RFID reader;
comparing the first temporary identifier and the stored tag ID and determining a matched state;
reducing the slot number by a predetermined number when they are not matched according to the result of determining the matching state; and
generating a second response message including the tag ID when the reduced slot number satisfies a specific value.

14. The method of claim 12, wherein iv) comprises storing the reduced slot number and standing by when the reduced slot number does not satisfy a specific value.

15. The method of claim 12, further comprising, after iv):
receiving a collision solving message including a discrimination code from the RFID reader;
determining whether the discrimination code corresponds to a second temporary identifier generated based on the tag ID; and
generating a third response message including the tag ID to the RFID reader when they correspond to each other.

16. The method of claim 12, further comprising standing by for receiving of data when the discrimination code does not correspond to the second temporary identifier.

17. The method of claim 13, wherein the second temporary identifier includes at least 16 bits among the bits of the tag ID.

18. A radio frequency identification (RFID) reader for reading a plurality of RFIDs, comprising:
a communicator for transmitting/receiving data to/from the RFID through RF signals;
a storage unit for storing predetermined round size information, and storing tag IDs included by the RFIDs and product information matched with the tag IDs; and
a controller for controlling the communicator and the storage unit, providing the round size information to the RFIDs, and sequentially identifying the tag IDs of the RFIDs by using a collision solving message when a collision is generated for a specific message received from the RFIDs, wherein the RFIDs randomly select a slot number based on the round size information.

19. The RFID reader of claim 18, wherein the controller comprises:
a collision state determining module for determining a collision state for the specific message received from the RFIDs;
a code managing module including a first storing module for storing a discrimination code and a second storing module for storing a test code, and changing the discrimination code and the test code stored in the first storing module and the second storing module according to a specific control;
a tag identifying module for detecting the tag ID based on the specific message received from the RFIDs, and generating a temporary identifier based on the detected tag ID; and
a control module for controlling the collision state determining module, the code managing module, and the tag identifying module, generating a collision solving message including the discrimination code based on the collision state of the collision state determining module, and transmitting the collision solving message to the RFIDs through the communicator.

20. The RFID reader of claim 19, wherein the control module generates a specific message including the temporary identifier or the round size information to the RFIDs so as to detect the tag ID of the RFIDs.

21. The RFID reader of claim 19, wherein the discrimination code includes at least one bit, a specific bit value is added to the discrimination code based on the MSB among the bit according to a control by the control module, or the discrimination code is updated based on the test code.

22. The RFID reader of claim 21, wherein the test code is generated based on the MSB among the bit included by the discrimination code according to a control by the control module.

23. The RFID reader of claim 19, wherein the temporary identifier includes 16 bits among the bits of the detected tag ID.

24. The RFID reader of claim 19, wherein the second storing module has a first input last output (FILO) structure.

25. A method for reading a radio frequency identification (RFID) by an RFID reader reading a plurality of RFIDs, the method comprising:
 a) requesting a tag ID from the RFID;
 b) receiving a first response message from the RFID, wherein the RFID receive a specific query message including round size information from the RFID reader and randomly select a slot number based on the round size information of the specific query message;
 c) generating a collision solving message including the stored discrimination code of 0 to the RFID when a collision is generated according to the received result;
 d) receiving a second response message corresponding to the collision solving message from the RFID;
 e) checking whether the MSB of the discrimination code is 1 when a collision is generated according to the result of receiving the second response message;
 f) adding a bit of 0 to the MSB of the discrimination code and changing it into a first discrimination code when the MSB is not 1 according to the result of checking the MSB; and
 g) generating a collision solving message including the first discrimination code to the RFID and repeating the steps after d).

26. The method of claim 25, wherein f) comprises:
 adding a bit of 1 to the MSB of the discrimination code to generate a first test code when the MSB is checked to be 1 according to the result of checking the MSB; storing the generated first test code; adding a bit of 0 to the MSB of the discrimination code to change it into a second discrimination code; and
 generating a collision solving message including the second discrimination code to the RFID, and performing the steps after d).

27. The method of claim 25, wherein e) comprises:
 e-1) checking whether the MSB of the stored discrimination code is 1 when no collision is generated at the received second response message;
 e-2) checking whether there is a stored test code when the MSB is 1 according to the result of checking the MSB;
 e-3) generating a third discrimination code based on the stored test code when the stored test code is found according to the result of checking the test code; and
 e-4) generating a collision solving message including the third discrimination code to the RFIDs, and performing the steps after d).

28. The method of claim 27, wherein e-2) comprises:
 when the MSB is not 1 according to the result of checking the MSB,
 generating a fourth discrimination code by changing the MSB of the discrimination code into the binary number of 1; and
 generating a collision solving message including the fourth discrimination code to the RFIDs, and performing the steps after d).

29. The method of claim 27, further comprising terminating the steps when the test code is not stored according to the result of checking the test code.

30. The method of claim 25, further comprising: before a), resetting the discrimination code and the test code; and setting the discrimination code to be 0.

* * * * *